March 9, 1971  R. P. DAVID  3,568,246
APPARATUS FOR MOLDING IMPROVED BULKHEADS FOR
SEISMIC STREAMERS AND THE LIKE
Filed Aug. 5, 1968  3 Sheets-Sheet 1
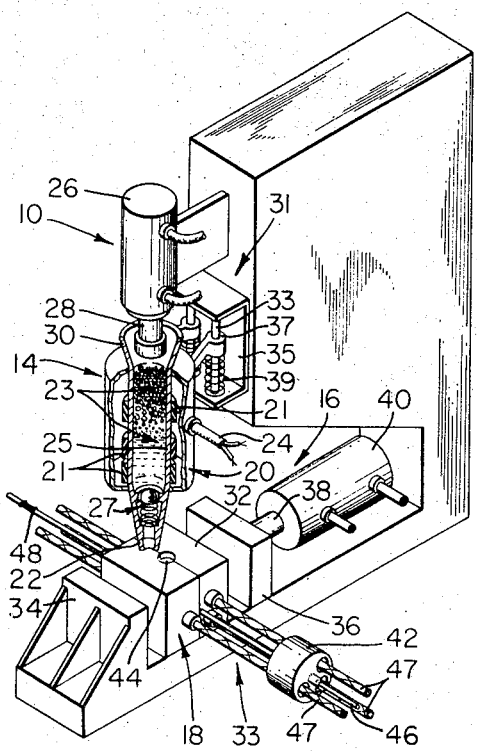
FIG_1
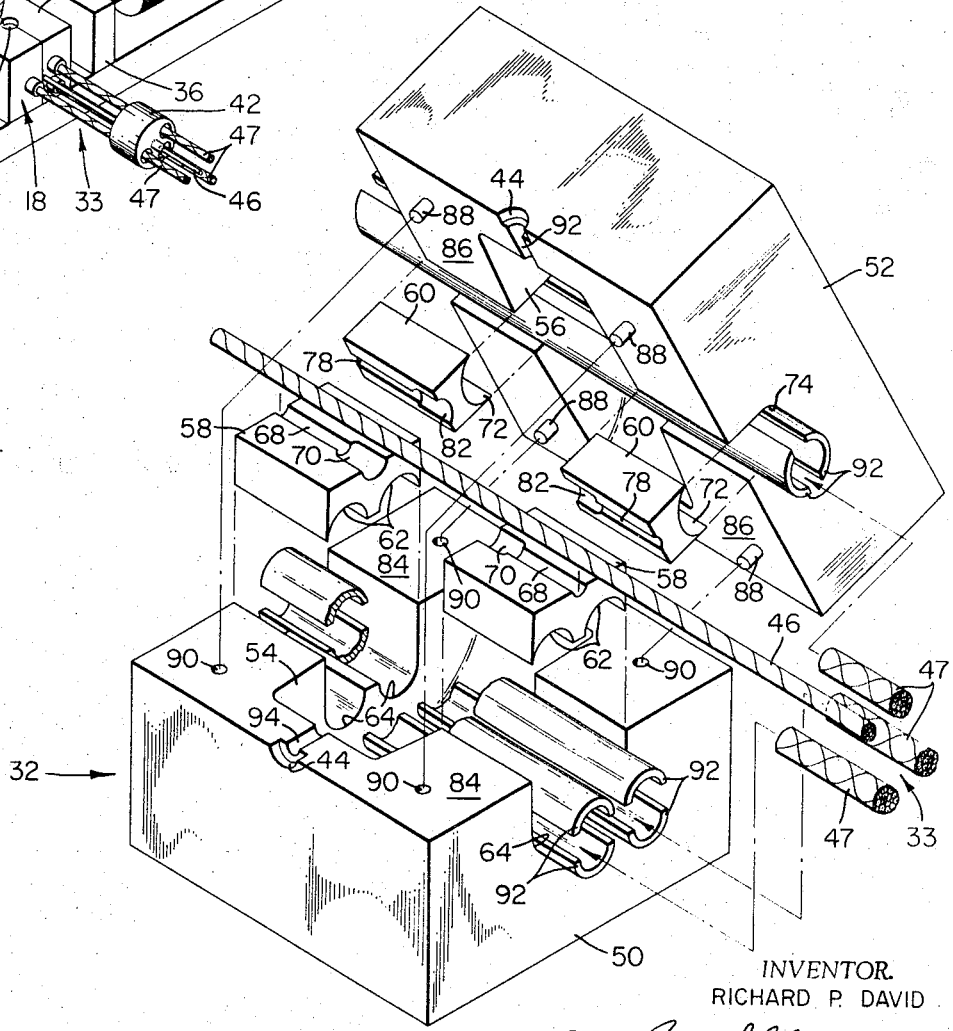
FIG_2
INVENTOR.
RICHARD P. DAVID
BY Robert H. Clay
ATTORNEY March 9, 1971 R. P. DAVID 3,568,246
APPARATUS FOR MOLDING IMPROVED BULKHEADS FOR
SEISMIC STREAMERS AND THE LIKE
Filed Aug. 5, 1968 3 Sheets-Sheet 2
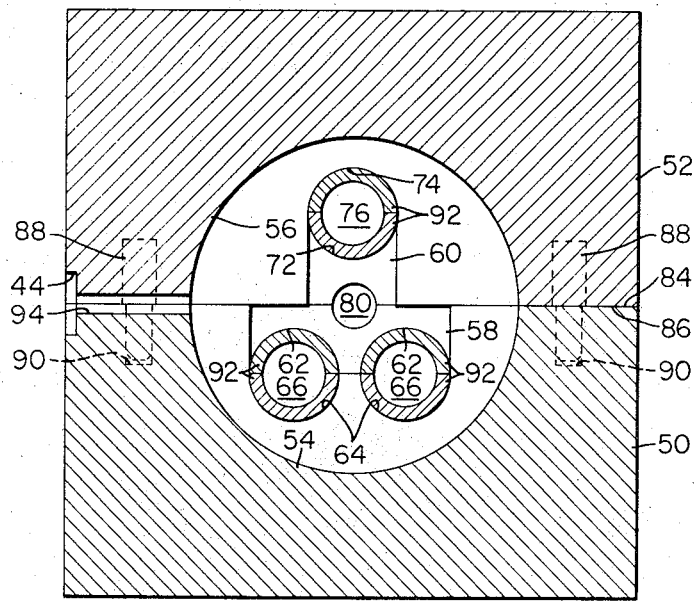
FIG_3
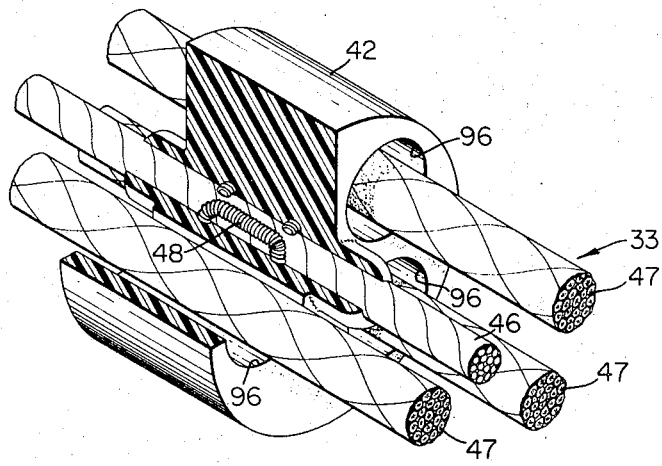
FIG_4
INVENTOR.
RICHARD P. DAVID
BY *Robert H. Clay*
ATTORNEY

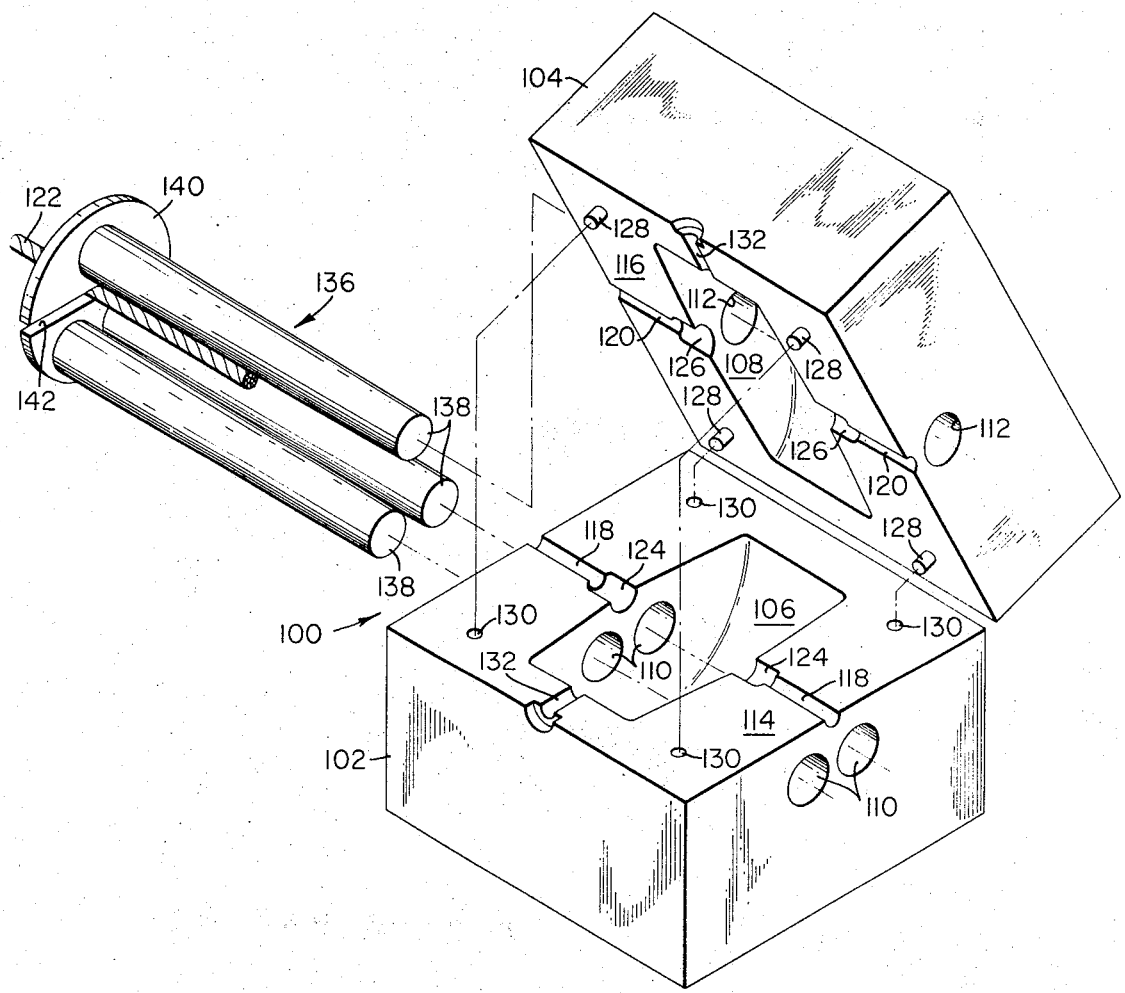
FIG_5
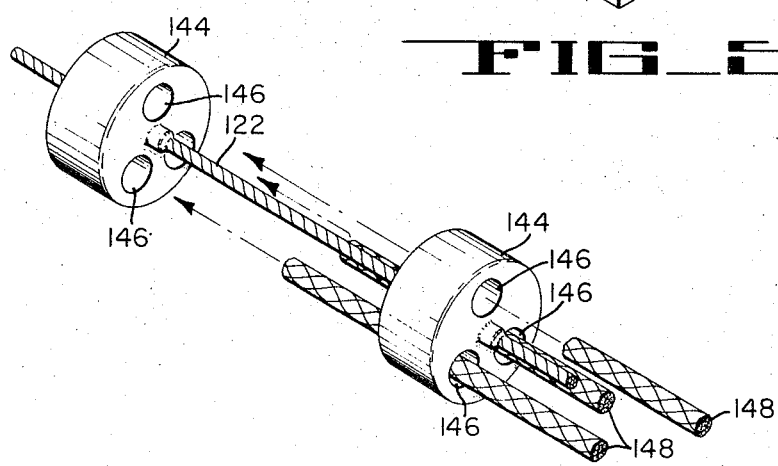
FIG_6
INVENTOR.
RICHARD P. DAVID
BY Robert S. Clay
ATTORNEY United States Patent Office 3,568,246
Patented Mar. 9, 1971

3,568,246
APPARATUS FOR MOLDING IMPROVED BULKHEADS FOR SEISMIC STREAMERS AND THE LIKE
Richard P. David, Houston, Tex., assignor to Mandrel Industries, Inc., Houston, Tex.
Filed Aug. 5, 1968, Ser. No. 750,237
Int. Cl. B29c 1/14, 11/00; B29f 1/19
U.S. Cl. 18—5                                             9 Claims

ABSTRACT OF THE DISCLOSURE

A bulkhead of improved impact strength and compressive loading properties is molded in place during the fabrication or repair of a streamer cable assembly. Fabrication in place is made possible by a split mold assembly having removable sections and either split or solid mandrels. The bulkheads may also be fabricated as a separate unit for use in other applications.

BACKGROUND OF THE INVENTION (1) Field of the invention

The present invention relates to the fabrication and repair of seismic streamer cables, and particularly to an improved bulkhead for use in streamer cables, and the process and apparatus for fabricating the bulkheads either in place or as a separate item. The bulkheads utilize improved materials to provide a bulkhead of select specific gravity, impact strength, etc.

(2) Description of the Prior Art

Heretofore, streamer cables have utilized preformed hard plastic bulkheads of either one or two piece design. That is, when initially fabricating a streamer cable, single piece bulkheads, having a center hole and a plurality of wire complex support holes radially spaced from the center hole, are slipped over the centrally extending cable or stress member as well as the various wire complexes. The bulkheads are evenly spaced apart and are crimped to the central stress member by suitable means so as to be held firmly in place, generally approximately a foot apart.

However, due to the adverse conditions to which they are subjected, streamer cables tend to require constant repair. One of the most common failures experienced by a streamer cable is due to the fracture of one or more bulkheads which, in turn, punctures or otherwise ruptures the polyvinyl chloride or polyurethane jacket used to enclose the cable electrical components, e.g., the wire complexes and the hydrophones. Such a rupture allows the sound transmitting fluid to escape from within the jacket while further allowing salt water to enter the jacket.

A damaged streamer cable is repaired by removing the jacket from a standard length of the streamer (called cable sections) and replacing the fractured bulkheads. Since the streamer sections are quite long, e.g., 230 feet, insertion of a single piece bulkhead starting from one end of the section, requires disassembly of generally a substantial portion of the section depending upon where the fracture occurred. Accordingly rather than disassemble a large portion of the section, prior art repair methods employ split bulkheads which are placed about the central stress member and are cemented or otherwise secured together to form a complete bulkhead. Such a bulkhead obviously is relatively weaker than one of single piece construction, and a weak point is thus produced in the streamer cable as a result of the repair thereof. This in turn gives rise to an increasing incidence of subsequent fractures and thus increased streamer cable failure.

Furthermore, prior art methods generally require of the order of 5–8 minutes to assemble a bulkhead in a streamer cable, whereas, in the present process, a bulkhead may be formed in place in about 2 minutes.

SUMMARY OF THE INVENTION

The bulkheads are formed in accordance with the invention, by an injection molding method which utilizes in its preferred embodiments, a special split mold assembly. In one embodiment of the invention principles, the split mold assembly is particularly adapted to allow the forming of a bulkhead as a single solid unit, directly in place over the central stress member and about the wire complexes of the streamer cable. The bulkhead is securely bonded to the stress member and is provided with a spaced plurality of holes through which the respective wire complexes are loosely disposed upon forming the bulkhead.

More particularly, in the apparatus of this embodiment, a split mold assembly has a cavity formed therein with dimensions equal to those of the desired finished bulkhead. Removable inserts are provided in either wall of the mold to allow the wire complexes to be placed in the mold without severing the wires, and a central bore is provided which receives the stress member. Hollow, slightly tapered mandrels split in half along their axial length are placed over each wire complex and within the inserts, wherein the mandrels extend the width of the mold and thus cover the wires along the length thereof within and beyond the mold cavity.

In the invention process and apparatus, the split mold is clamped securely together, and the bulkhead material is injected under selected temperature and pressure conditions. Since the stress member is exposed within the cavity, the bulkhead material is formed directly thereto, but the split mandrels prevent the material from contacting the wire complexes. After the bulkhead is formed, the halves of the mold are removed from about the streamer cable, and the inserts and the split mandrels are removed, allowing the complete disassembly of the mold components from about the stress member and wire complexes of the streamer cable. The bulkhead is formed as a single unit securely fixed to the central stress member, with axially extending holes formed therein through which the wire complexes are loosely disposed, as in the original fabrication of the streamer.

Several modifications are provided in the fabrication process as well as in the associated mold construction, whereby the bulkheads are secured only to the central stress member as utilized in the course of fabricating the streamer cables. In this application, the bulkheads are not molded in place about the wire complexes, and thus solid, slightly tapered mandrels are used to provide the support holes through the bulkheads. The wire complexes are then subsequently threaded through the support holes in the bulkheads during the process of assembling the streamer. These latter mandrels do not have to be solid, and may in fact be the hollow split mandrels used in the first mentioned embodiment which, however, only complicates the apparatus.

In still another embodiment of the invention concepts, a solid, slightly tapered mandrel is also provided through the center of the mold, and bulkheads are formed as a separate single unit with a central hole as well as the radially spaced series of holes therethrough. The mold is provided with a radially extending pin which extends from the circumference of the mold and into the cavity to communicate with one of the series of holes. The formed bulkhead thus includes a radially extending hole which is threaded to allow the insertion of a locking screw. Such bulkheads may be threaded along a plurality of tough nylon ropes with the locking screw tightened against different ropes on consecutive bulkheads, to provide an "acoustic" section of streamer cable; i.e., a section of cable used at the boat end of the streamer which utilizes the "stretching" property of nylon to cushion the shock imparted to the streamer cable when starting the boat.

BRIEF DESCRIPTION OF THE DRAWING

FIG. 1 is a simplified perspective view of injection molding apparatus in accordance with the concepts of the invention;

FIG. 2 is a blown-apart perspective view of a split mold assembly of the present invention;

FIG. 3 is a cross-section view of the mold shown in FIG. 2 upon assembly of the mold components alone;

FIG. 4 is a cut-away perspective view of a bulkhead formed in place along a streamer cable with the split mold assembly of FIGS. 2, 3;

FIG. 5 is a blown-apart perspective view of another split mold assembly of the invention; and FIG. 6 is a perspective view of a section of central stress member including two bulkheads formed with the split mold assembly of FIG. 5.

DESCRIPTION OF THE PREFERRED EMBODIMENTS

Referring to FIG. 1, injection apparatus 10 is shown which is capable of performing a bulkhead molding process in accordance with the invention. More particularly, a frame 12, shown here in simplified form, supports injection means 14, mold clamping means 16, and mold assembly means 18. The injection apparatus 10 is generally conventional in design, wherein the injection means 14 includes a material dispenser 20 secured in translatable relation to the frame 12, and adapted at its lower end with an injection nozzle 22. The dispenser 20 is vertically translatable as further described below. The dispenser 20 is heated to selected temperatures along its vertical length, as by means of spaced series of electrical heating bands 21, or the like, disposed therein and energized via conductors 24. The bands 21 are arranged to provide a greater degree of heat along the lower portion of the dispenser 20, so that melting of a "plastic" material 23 occurs, along the lower portion. A hydraulic cylinder 26 is secured to the frame 12, and a movable plunger 28 thereof extends coaxially through a funnel 30 and into a dispenser chamber 25 within the dispenser 20. The cylinder 26 is hydraulically actuated via respective hoses coupled to a hydraulic source (not shown).

In operation, material 23 to be injected is fed into the dispenser 20 via the funnel 30 and differentially is heated along the length thereof to a selected temperature, and thus degree of fluidity, by the heater bands 21 of previous mention. Subsequently actuating the cylinder 26 urges the plunger 28 downward into the dispenser chamber 25 against the slightly heated, and thus fused but still firm, material in the top portion of the chamber 25. The lower melted portion of the material 23 is forced out the nozzle 22 under a selected pressure. The minimum pressure is preferably regulated by a check valve 27 placed in the injector nozzle 22, which prevents egress of the melted material 23 until the plunger 28 generates the selected minimum pressure. The material 23 used to form the bulkheads in accordance with the invention may be any of various thermoset plastic materials, such as for example polyethylene, thermoplastic, polystyrene, rigid polyvinyl chloride, polyurethane, polypropylene, acrylic material, etc.

In accordance with the invention, the mold assembly means 18 of previous mention comprises a split mold assembly 32 which, due to its design, can be assembled about an existing continuous length of streamer cable 33 without having to cut the streamer. The split mold assembly 32 is further described infra. Since the mold is split, it must be clamped solidly together during the injection of material into the mold by the injection means 14. To facilitate the clamping action, a hydraulically activated vise is provided, which includes a stationary jaw 34 and a reciprocable jaw 36. The jaw 36 is coupled to a plunger 38 of a hydraulic cylinder 40, which when actuated urges the reciprocable jaw 36 towards the stationary jaw 34, thus clamping the split mold assembly 32 together about the streamer cable 33 under selected pressure.

At such time as the split mold assembly 32 is secured about a point along the cable 33 where a bulkhead is to be formed, the dispenser 20 is lowered to press the nozzle 22 tightly into a depression 44 in the surface of the split mold assembly 32.

Translation of the dispenser 20 is provided herein, by way of example only, by a spring-loaded slide assembly 31, which includes a pair of vertical slide members 33 supported by a bracket 35. A pair of bushings 37 are secured to the dispenser 20, and are disposed to slide along respective slide members 33. A pair of compression springs 39 are disposed about the members 33 below the bushings 37. As the plunger 28 is lowered against the material 23, sufficient pressure is exerted against the dispenser 20 to overcome the resistance offered by the springs 39, but not to generate enough pressure within the chamber 25 to overcome the check valve 27. Thus the injection nozzle 22 is forced against the depression 44 in the split mold assembly 32 before material is ejected from the nozzle 22.

Upon application of more pressure via the plunger 28, the setting of the check valve 27 is overcome and material under selected pressure is forced into the mold and about the streamer cable 33 to form the bulkhead. A finished, molded bulkhead, generally indicated herein by numeral 42, is securely bonded to a centrally extending cable or stress member 46 of the cable 33, with a series of radially spaced holes formed in the bulkhead 42 to receive and loosely support respective wire complexes 47.

Although the invention process provides a bulkhead which is bonded under pressure directly to the stress member 46 of the streamer cable 33, bulkhead locking means is provided in addition, to assure that the injected bulkheads 42 will not rotate or translate with respect to the stress member 46 when the cable is being used. To this end, a bulkhead stress member lock 48 may be securely crimped to the stress member 46 at points therealong where a bulkhead 42 is to be formed. The bulkhead is then formed around the lock 48 and is thus securely bonded to the stress member 46. The lock 48 is pre-formed of a length of rod threaded along its entire length. The rod is bent at right angles at both ends and then formed into circles, which circled ends are crimped to the stress member 46 as shown. To improve the bond between the bulkhead 42 and the stress member 46, a thin wall coating of the same material used to form the bulkhead may be first applied to the stress member.

It is to be understood that the invention process and apparatus may be used for forming items other than bulkheads, about members other than seismic streamer cables. Only for reasons of simplicity of description is the invention concept herein specifically described with reference to forming bulkheads for streamer cables. Further, although the streamer cable 33 herein has a central stress member 46 and three wire complexes 47, and thus has three holes through the bulkhead 42 each of which supports therethrough one of the wire complexes, it is to be understood that any number and arrangement of wire complexes and thus holes may be employed within the spirit of the invention.

Referring to FIG. 2 there is shown in greater detail one embodiment of the split mold assembly 32 which is adapted for the repair of an existing streamer cable, as part of the apparatus shown in FIG. 1. The assembly includes a pair of blocks 50, 52 of similar outside dimensions which are formed preferably of a metal material such as aluminum, but may also be formed of other suitable materials. The blocks 50, 52 have identical (half) cavities 54, 56 respectively, formed therein with dimensions equal to the desired dimensions of the finished bulkheads. The lateral walls of the blocks 50, 52 are machined to remove selected portions thereof. Block 50 is provided with a pair of removable inserts 58, and block 52 is provided with a pair of removable inserts 60 adapted to fit within the removed portions of the lateral walls.

Regarding first the block 50, the removable inserts 58 each have a pair of parallel grooves 62 formed therein which are semicircular in cross-section and which confront and thus complement a similar matching pair of semicircular grooves 64 formed in the bottom of the removed portions of the lateral walls. Thus, as shown in FIG. 3, upon assembly of the inserts 58 within the walls of the block 50, a pair of parallel bores 66 are defined through the walls of the block which communicate with the volume of the (half) cavity 54. The inserts 58 are also provided with coaxially extending grooves 68 which are semicircular in cross-section and have a radius equal to, or slightly smaller than, the radius of the stress member 46 of previous mention. The ends of the grooves 68 nearest the half cavity 54 are formed into enlarged groove portions 70 which have a radius substantially larger than the radius of the stress member 46.

Regarding the block 52, the removable inserts 60 have single grooves 72 formed therein, which are semicircular in cross-section and which confront and thus complement similar matching grooves 74 formed in the bottom of the removed portions of the lateral walls. The radius of the semicircular grooves 72, 74 is the same as that of grooves 62, 64 of block 50. As shown in FIG. 3, upon assembly of the inserts 60 within the walls of the block 52 a single bore 76 is defined through the walls of the block. When the blocks are assembled together, the axes of the bores 66, 66, and 76 lie at the apexes of an isosceles triangle whose base is defined by the bores 66, 66 of block 50.

The inserts 60 are provided with coaxially extending grooves 78 which are semicircular in cross-section and have a radius equal to that of the grooves 68 in the inserts 58. As may be seen from FIG. 3, upon assembly of the blocks 50, 52 with the inserts 58, 60, the grooves 68, 78 are disposed in register to define a coaxially extending bore 80 which receives and tightly confines within the walls of the blocks 50, 52 the stress member 46 during the molding process. The ends of the grooves 78 nearest the (half) cavity 56 are machined to form enlarged groove portions 82 which match the enlarged groove portions 70 of inserts 58.

Surfaces 84, 86 of the blocks 50, 52, respectively, are lapped or milled to a smooth finish along with the respective coextensive surfaces of the inserts 58, 60. Surface 84 confronts the surface 86 at such time as the split mold assembly 32 is assembled and clamped together, thus confining the injected material within the cavity 54-56. To provide precise and repeatable alignment of blocks 50, 52 and thus of the half cavities 54, 56 and inserts 58, 60, etc., a plurality of pins 88 are pressed into holes drilled into the surface 86. The block 50 is provided with a similar plurality of holes 90 in the surface 84, which holes are in register and thus mate with respective pins 88 to allow consistent alignment of the blocks 50, 52.

To facilitate the disassembly of the split mold assembly 32, the grooves 62–64 and 72–74 are slightly tapered along their lengths, and so also are the mandrels which are disposed to fit snugly therein, as further described infra.

When injecting a bulkhead around an existing streamer cable, a plurality of split mandrels 92, shaped in the form of slightly tapered tubes and having lengths greater than the widths of the blocks 50, 52, are placed in respective slightly tapered bores 66, 66 and 76, i.e., within the confronting grooves 62, 64 and 72, 74. Use of the split mandrels 92 allows the injection of material around the wire complexes 74 without actually molding the material to the complexes. That is, holes in the injected bulkhead are provided in which the wire complexes 47 are loosely disposed, yet supported. An injection hole 94 is provided which extends from the depression 44 through the mold and to the cavity 54–56.

In operation, referring to FIGS. 1–4, when a fractured bulkhead is to be replaced in accordance with the invention, the blocks 50, 52 are placed about the streamer cable 33 with the inserts 58, 60 removed, and wherein only the half of the split mandrels 92 which are disposed in the groove 64, 74 being in place. The wire complexes 47 are then placed within the halves of the split mandrels 92 which are in place, and the other half of each mandrel 92 is fitted over the complexes thereby loosely confining the latter within their respective complete mandrels. The inserts 58, 60 are then fitted within the walls of the blocks 50, 52 to define complete walls (and thus complete the cavity 54–56) while confining the split mandrels 92 about respective wire complexes 47. Next the blocks 50, 52 complete with inserts, mandrels, and wire complexes, are placed together with the pins 88 disposed in the holes 90 and with the stress member 46 disposed within the confronting grooves 68, 78 in inserts 58, 60 respectively. The assembled split mold assembly 32 is then placed on its side between the jaws 34, 36 of the clamping means 16, and the cylinder 40 is actuated to securely clamp the blocks 50, 52 together. The plunger 28 is actuated to first lower the dispenser 20 and thus urge the nozzle 22 thereof against the depression 44, and thereafter to force the material to be injected from the dispenser 20. The pressures are selected according to the material being injected and may vary on the order of 4,500 to 10,000 pounds per square inch. The material flows into the cavity 54–56 via the injection hole 94, thereby filling the cavity 54–56 and also the enlarged groove portions 70, 82 circumjacent about the stress member 46. The injection time is of the order of 15 seconds. After the material sets, which takes approximately 30 to 45 seconds, the pressure is released from the cylinder 40 and the reciprocal jaw 36 is withdrawn by hydraulic pressure via a 4-way valve or other means coupled to the cylinder 40 (not shown) to release the split mold assembly 32. The assembly 32 is disassembled, the inserts 58, 60 are removed from the blocks 50, 52 and the split mandrels are slid along the wire complexes 47 and from within the holes which have been formed thereby in the bulkhead. As previously noted, the holes and mandrels 92 are slightly tapered along their lengths, thereby allowing the mandrels to be easily removed from the blocks and the bulkhead after tapping sligfhtly on the smaller ends thereof. As shown in FIG. 4, upon completion of the invention injection process, the bulkhead 42 is bonded to the stress member 46, and includes therein a plurality of holes 96 radially spaced from the stress member. The wire complexes 47 are loosely disposed through respective holes 96 in the bulkhead. A bulkhead stress member lock 48 may be crimped to the member 46 prior to the injection of the bulkhead 42, to provide positive locking between the bulkhead and stress member as previously mentioned. Each bulkhead is generally formed in the total time of approximately two minutes.

Referring now to FIG. 5, there is shown another mold assembly means as utilized in an alternative embodiment of the invention concept, and comprising a solid mandrel, split mold assembly 100. The assembly 100 is formed of two blocks 102, 104 similar to blocks 50, 52 of FIGS. 2 and 3. However, blocks 102, 104 do not require the require the removal of the selected portions of the walls with the addition of inserts, such as previously described. This embodiment of the invention apparatus is particularly used in the fabrication of new streamer cables, wherein the bulkhead is to be formed in place about only the central stress member prior to threading the plurality of wire complexes through the bulkheads. Thus, the split mold assembly 100 provides a configuration which allows it to be clamped about the stress member as in the previous split mold assembly, but wherein the mandrels do not have to be split. Thus this embodiment provides a bulkhead formed about a stress member, with radially spaced holes in the bulkheads for the subsequent addition, rather than in-place molding, of the wire complexes and geophones.

According, in FIG. 5 complementary half cavities 106, 108 are formed in blocks 102, 104 respectively. A pair of parallel bores 110 are formed through the walls of the block 102 and a single bore 112 is formed through the walls of block 104. When the blocks are assembled together the axes of the bores 110–112 lie at the apexes of an isosceles triangle with its base defined by the bores 110, 110. The blocks 102, 104 have confronting surfaces 114, 116 to receive therebetween a stress member 122. The ends of the grooves 118, 120 nearest the respective (half) cavities 106, 108 are further machined to form enlarged groove portions 124, 126 respectively. Pins 128 are pressed into holes in the block 104 and protrude therefrom to fit into respective holes 130 in the bloc 102 to align the (half) cavities 106, 108 at such time as the split mold assembly 100 is assembled. Matching injection grooves 132, 132 are formed along the surfaces 114, 116 and form thus an injection hole extending through the end wall of the blocks 102, 104 when the blocks are assembled together.

In operation, the stress member 122 is placed between the blocks 102, 104 in the grooves 118, 120 and the blocks are aligned and assembled by fitting pins 128 into holes 130. The assembled blocks are placed on their side between the jaws 34, 36 of the injection apparatus 10 of FIG. 1. The blocks are clamped together via action of the cylinder 40, thereby confining the stress member 122 within the split mold assembly 100 at the selected point therealong where a bulkhead is to be molded.

Prior to injecting the material, mandrel means 136 is provided which extends through the bores 110, 110 and 112. The mandrel means 136 may be simply three separate rods which are disposed into respective bores 110, 112. However, a preferred construction for the mandrel means 136 is as shown in FIG. 5, where three solid rods or mandrels 138 are secured at one end thereof to a mandrel support 140. A radially extending slot 142 is formed in the mandrel support 140, which slot extends to the center thereof. As previously mentioned with regard to the split mold assembly 32 of FIGS. 2 and 3, the bores 110, 112 and the mandrels 138 are slightly tapered to allow their being inserted snugly within the bores, and to facilitate assembly and disassebly of the assembly 100.

After the assembly 100 is clamped into the clamping means 16, the mandrel means 136 is slipped over the stress member 122 with the stress member 122 disposed within the slot 142 as shown in FIG. 5, and the means 136 is then slid towards the blocks 102, 104 whereby the mandrels 138 fit into respective bores 110, 110 and 112 in the blocks. The process of injecting material into the assembly 100 is similar to that described supra, with reference to FIGS. 1–3. After the bulkhead is formed, the mandrel means 136 and blocks 102, 104 are disassembled in that order, and the assembly 100 is removed from around the stress member 122. As seen in FIG. 6, bulkheads 144 are thus formed, which are similar in configuration to bulkhead 42 shown in FIG. 4. Radially spaced holes 146 are provided through which wire complexes 148 may be threaded during the subsequent streamer cable fabricating process. Bulkhead stress member locks, similar to lock 48 of FIGS. 1 and 4, may be used with each bulkhead formed if desired.

Although the invention has been described with respect to several specific embodiments of the process and apparatus, various modifications may be made within the spirit of the invention. Thus, the split mold assembly (32 or (100) may be designed to form a bulkhead about a stress member which has, for example, 4 holes radially spaced therefor. That is, two of the bores in the mold lie in the plane of the confronting surfaces of the blocks, and each of the other two bores are formed in a respective block. The bores are formed by split mandrels and inserts as described supra, and are disposed along a plane perpendicular to the confronting surfaces. On the other hand, a single larger bore could be formed in the side walls of only one block, or between both blocks, thereby offering a support in the form of a larger hole for a single wire complex which would lie along the stress member of the seismic streamer cable.

Likewise, the materials used to form the bulkheads may be of various plastics presently available in the art as heretofore enumerated. Further, during the injection process the specific gravity of the streamer cable, and thus its ability to float at various levels in either salt or fresh water, may be varied by modifying the invention process.

To this end, a "blowing" agent is added to the material in solid form, prior to introducing the material to the injection apparatus, and lower injection pressures are used, whereby the formed bulkheads have a lower specific gravity. The "blowing" agent is a chemical additive such as made by plastics suppliers, e.g., Du Pont, Avisun, etc., which foams the material during the heating process where in the amount of foaming is, in part, determined by the injection pressure applied. Thus, unlike streamer cables formed with prior art bulkheads, the streamer cables formed with the invention bulkheads allow the variation of specific gravity of the overall streamer cable to provide the specific flotation properties desired for a particular seismic exploration application.

Other properties of the bulkhead besides the specific gravity may readily be varied when utilizing the invention process and apparatus. For example, the impact strength of the bulkhead may be increased by adding selected percentages of the order of 15% to 30% of a glass fiber prior to introducing the solid plastic material to the injection apparatus. Injection is generally accomplished with such additional glass fiber at somewhat higher pressures. Also, the bulkheads may be color coded by adding a small percentage of color concentrate materials (e.g., ½% to 5% depending on the material), whereby bulkheads of a selected color are used in streamer cables to define the specific use of that length of cable; e.g., green and red bulkheads may indicate an "active" and an "inactive" section of streamer cable, respectively.

Furthermore, although the grooves and mandrels formed in split mold assembly are shown as cylindrical in shape, other cross-sections, e.g., square, rectangular, oval, etc., may be used instead. Likewise, in the apparatus of FIG. 1, although hydraulic means are shown to actuate the various translatable components, other means could be used for that purposes; e.g., levers and springs, electro-magnetic devices, etc.

Accordingly, it is not intended to limit the scope of the invention except as defined by the following claims.

What is claimed is:

1. Apparatus for fabricating bulkheads about a continuous stress member, said bulkheads having at least one hole extending therethrough at a position spaced from the continuous stress member, the apparatus comprising the combination of:

mold assembly means having a cavity, formed of a split mold assembly and including a pair of blocks; wherein a portion of the cavity is formed in each block to form side walls therein, and at least one bore is coaxially formed through the opposite side walls of one block to define a coextensive pair of bores in communication with the cavity;

wherein portions of the side walls are removable from at least one block to define insert means disposed in the removed side wall portions thereof;

a mandrel member disposed within the bores in the opposing walls and adapted to extend through the cavity, said mandrel member retained by the insert means, and upon removal defines said hole in the bulkhead;

means for demountably clamping the mold assembly means together as a unit; and means for introducing a selected material into said cavity and about the mandrel means under selected pressure and temperature conditions commensurate with the material.

2. The apparatus of claim 1 wherein at least one pair of bores are coaxially formed through the opposing side walls of each block and mandrel members are disposed within each of the respective bores to extend through the cavity.

3. The apparatus of claim 2 wherein the mandrel member comprises a hollow mandrel split along its length and confined by the insert means disposed in the opposing walls of the block, wherein removal of the insert means allows removal of a respective portion of the split hollow mandrel.

4. The apparatus of claim 3, wherein the blocks are adapted to fit together with the cavities thereof in alignment, said removed side wall portions being formed to define selected portions of the pairs of bores, wherein the insert means define removable inserts which fit snugly in respective removed side wall portions and are further formed to define portions of the bores complementary to those of the removed side wall portions, wherein disposing the inserts in the respective side walls thus forms the respective pairs of bores; wherein the other sides of the confronting insert means of confronting blocks are adapted to receive therethrough the continuous member when the blocks are assembled, and wherein said split hollow mandrels are disposed in respective ones of said bores upon assembly of the split mold assembly within the means for clamping.

5. The apparatus of claim 2 wherein the mandrel member comprises a solid mandrel disposed within the respective coextensive pair of bores.

6. The apparatus of claim 2 wherein the means for clamping includes a fixed jaw and a reciprocating jaw adapted to confine the assembled split mold assembly therebetween at selected pressure; and the means for introducing a material includes material dispensing means having an injection nozzle adapted to bear against the split mold assembly when confined by said jaws and to introduce the material into the cavity.

7. The apparatus of claim 6 wherein the material is one of the thermoset plastics.

8. The apparatus of claim 7 wherein the material further includes a selected percentage of glass fiber.

9. The apparatus of claim 7 wherein the material further includes a selected percentage of a blowing agent for causing a foaming action during the injection process to vary the specific gravity of the formed bulkhead.

References Cited

UNITED STATES PATENTS

| | | | |
|---|---|---|---|
| 2,176,604 | 10/1939 | Benkelman | 18—36UX |
| 2,497,757 | 2/1950 | Bonnett | 18—36 |
| 2,995,777 | 8/1961 | Warnken | 18—36 |
| 3,199,829 | 8/1965 | Calim | 18—36UX |
| 3,103,704 | 9/1963 | Stein et al. | 18—36 |
| 3,387,076 | 6/1968 | Murooka | 18—42(D)X |
| 3,402,430 | 9/1968 | Hill | 18—36 |
| 3,422,495 | 1/1969 | Jones | 18—47(m) |
| 3,427,689 | 2/1969 | Windecker | 18—47(m) |
| 3,442,323 | 5/1969 | Lewis et al. | 18—36UX |
| 3,496,609 | 2/1970 | Ferguson | 18—36 |

J. SPENCER OVERHOLSER, Primary Examiner

R. L. SPICER, Jr., Assistant Examiner

U.S. Cl. X.R.

18—42; 264—251